Sept. 18, 1956 W. M. FAIRBANK 2,763,858
CALIBRATOR FOR RADIO ECHO SYSTEM
Filed Dec. 18, 1945

INVENTOR
WILLIAM M. FAIRBANK

BY *M. O. Hayes*

ATTORNEY 2,763,858
Patented Sept. 18, 1956

2,763,858

CALIBRATOR FOR RADIO ECHO SYSTEM

William M. Fairbank, New Haven, Conn., assignor, by mesne assignments, to the United States of America as represented by the Secretary of the Navy Application December 18, 1945, Serial No. 635,786

4 Claims. (Cl. 343—17.7)

This invention relates to apparatus for testing or checking the efficiency of operation of a radar system, and for determining whether its transmitter or receiver is out of proper adjustment. The criterion applied is the power difference between the peak transmitted power and the minimum detectable signal.

The object of the invention is to provide a simple, easily installable apparatus for making such test without need of using additional extraneous oscillator, signal generator or other power consuming tubes for the testing purpose.

Figure 1:
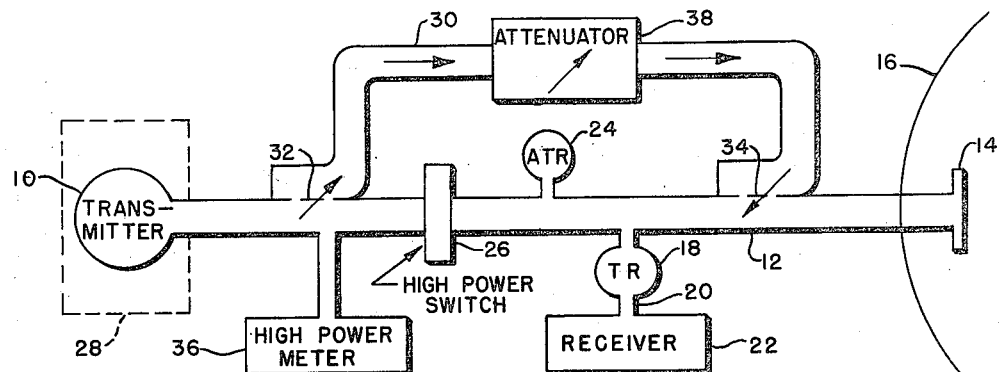
Figure 2:
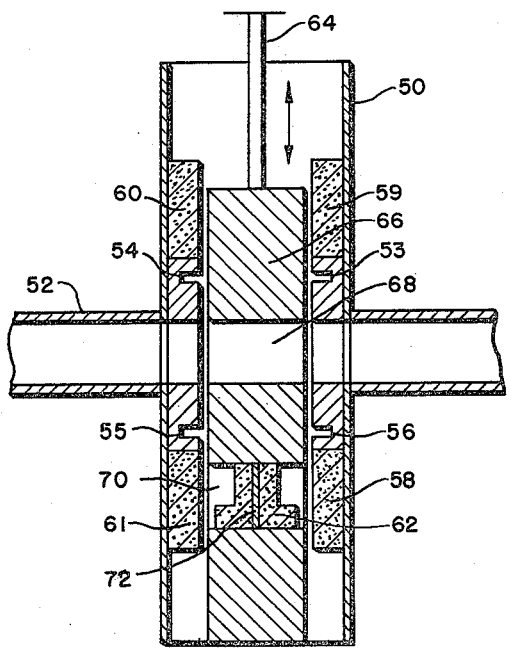

Fig. 1 is a diagram illustrating the principle of the invention and Fig. 2 is a section view of one type of wave guide switch which is a necessary component for convenient and effective employment of the invention.

The testing may be done in accordance with this invention by shutting off the transmitter from the main line by a highly effective blocking switch of some kind and then coupling a measured proportion of the transmitter power to the receiver through an attenuator which reduces the coupled signal to the minimum that can be detected by the receiver. The calibration of the attenuator will give the desired power ratio referred to above. By measuring the actual transmitter output at the same time it is possible to ascertain positively the operating efficiency of the transmitter and the receiver.

The measurement of the transmitter output power monitors the performance of the transmitting part of the radar system. This information plus the test with the calibrated attenuator gives an absolute check on the receiving system performance. The same principle applies to echo box testing. However, the present device is more accurate and is not critical with respect to frequency shifts caused by changes of temperature, tube replacements etc.

Referring now to Fig. 1 there is shown diagrammatically the arrangement of components in accordance with the invention. As in the usual radar system, there is indicated a transmitter or magnetron 10 connected by the main wave guide 12 to the primary radiator 14 energizing a reflector 16 the latter items being a common antenna type. Also indicated are a conventional receiver protective transmit-receive switch 18 on the branch guide 20 leading to the radar receiver 22. Between the receiver branch guide 20 and the transmitter is shown a conventional anti-transmit-receive switch 24.

In addition there is provided a high power blocking switch 26 in the main line 12 with the transmitter on one side and the receiver and the antenna on the other. Also the transmitter itself should be provided with a complete shield 28 to prevent leakage of energy from the transmitter 10 to the receiver 22 except through a desired testing channel to be described. Likewise the blocking switch 26 in the main guide 12 should do as complete a blocking job as possible when testing is being done.

For the purpose of testing there is provided in accordance with the invention an auxiliary wave guide section or test section 30 coupled into the main guide 12 at point 32 on the transmitter side of the blocking switch 26 by any standard wave selector or directional coupling methods and also provided with wave selector or directional coupling back into the main guide 12 at point 34 on the receiver side of the blocking switch 26.

On the main guide 12 near the transmitter a standard high power meter 36 is provided for measuring the transmitted power. In the test line 30 is inserted a previously calibrated variable attenuator 38.

The testing operation is as follows. With the magnetron 10 properly shielded to prevent leakage and with the main line 12 blocked by switch 26 a definite known proportion of the transmitted power is directionally coupled into the test wave guide section 30, is reduced by being passed through a variable attenuator 38 which has been previously calibrated to indicate the ratio between input and output power thereof, and is then again directionally coupled back into the main guide 12 at point 34 to feed the receiver 22. The attenuation is increased until the minimum signal to which the receiver 22 will respond is being passed. The ratio of the transmitted power to the minimum receivable signal is thus obtained from the calibrated attenuator 38. Simultaneously the actual value of the transmitted power being put out by the magnetron 10 can be measured by any standard method as by meter 36. From these measurements and their comparison with previous tests, the performance is checked of the transmitter receiver and the associated plumbing so-called which includes the TR box 18, the wave guide 20 and a portion of the main wave guide 12.

The apparatus of this invention can be added to the original radar system with very little additional complication, no additional power nor oscillator being needed. It is important, however, that the shielding of the transmitter and the shutting off by the switch be efficient to prevent any leakage of energy that can be detected by the receiver during testing. The switch 26 is designed also of course to present to the magnetron 10 the characteristic impedance of normal operation.

It may be noted that the directional couplers at points 32 and 34 are permanent, non-adjustable components which serve two functions. They act to attenuate the transmitter output power very greatly so that the variable attenuator 38 need provide only a fine adjustment to be added to reduce the signal to the receiver threshold value. Also the directional coupling at point 34 rejects power normally coming in from the antenna 14 and so is prevented from bleeding away a large portion of normal incoming echo signals.

It should also be noted that in the testing operation the metered energy through the by-pass channel 30 has the same frequency as normal receiver signals because both are caused by the same transmitter. Also the metered energy has the same pulse form as normal echo signal and it enters the receiver 22 plumbing 18 from the same direction as normal signals from the antenna 14 because of the directional coupling and its point of entry 34 with reference to the receiver 22. For instance, if otherwise directional coupling point 34 were between points 26 and 24, the system would not be operative.

Referring now to Fig. 2 there is shown in section one type of high power switch suitable for blocking the main line during the test which will satisfactorily perform the function of shutting off the high power efficiently and also of presenting the characteristic impedance of normal operation at the same time. The constructional details appear in the drawing. The box 50 containing the switch is constructed on the wave guide 52 with standard choke joints 53, 54, 55 and 56 at the junction points. Above and below these joints in the plane normal to the energy transmission, polyiron sections 58, 59, 60 and 61 are mounted in the box to absorb any energy that may leak around the edges of the chokes or around the movable polyiron step-shaped member 62 when raised into the upper position by a rod 64 and intermediate plunger 66 for blocking the wave guide 52 against passage of energy therealong.

The metal plunger 66 which can be moved up and down by rod 64 contains two openings through it which can be aligned with the wave guide 52. One opening 68 is empty and of the same cross section as the guide 52 so that a continuous guide is provided in this position (the one shown in the figure). The other opening 70 contains the polyiron step 62 which fills the guide dimensions normal to energy transmission and so constitutes an open switch when raised into alignment with the guide 52 to serve as a line termination or short circuit, which presents the same impedance to the magnetron as do the line and antenna in the switch closed position. Likewise the step is adapted to present to the other direction the same impedance that would occur in the position of normal operation.

In the center of the step 62 is a metal fin 72 to prevent energy of a level detectable by the receiver from passing through the switch. Since the switch is electrically symmetrical, the functions are effective in both directions.

While a particular specific embodiment has been shown and described the invention should be deemed limited only by the spirit of the appended claims.

What is claimed is:

1. In a radar system having a transmitter and a receiver coupled to a main wave guide, a test apparatus for ascertaining the ratio of transmitted power to the minimum signal detectable by said receiver, comprising a high power switch, inserted near the transmitter in the main wave guide for blocking passage of transmitted energy along the wave guide and simultaneously presenting to the transmitter and to the receiver the characteristic impedances of normal operation, a test wave guide section shunted around said switch and directionally coupled into the main guide on either side of said switch for cooperating with portions of said main guide to transfer energy from said transmitter to said receiver, and a variable attenuator inserted in said test guide for reducing the energy being transferred to the receiver said attenuator being calibrated for measuring the ratio of the power input to said attenuator to the power output thereof.

2. In combination, an apparatus in accordance with claim 1 and a high power meter for measuring the actual power output of said transmitter whereby it may be ascertained whether the transmitter and the receiver are properly adjusted.

3. Apparatus for testing the efficiency of a radar system, comprising a transmitter and a receiver coupled to a common antenna by a conventional wave guide transmission line, means for blocking the passage of energy from said transmitter through said transmission line, an adjustable attenuator, means for measuring the power input to said attenuator, a test path including said attenuator shunting attenuated energy from said transmitter around said blocking means to said receiver, whereby the adjustment of said attenuator serves to indicate the ratio of transmitted power to the minimum signal detectable by said receiver.

4. Apparatus for testing the efficiency of a radar system, having a transmitter and a receiver coupled to a common antenna by a conventional wave guide transmission line including conventional protective devices, comprising, a calibrated adjustable attenuator, a test path including said attenuator, means for blocking the passage of energy from said transmitter through said transmission line, directional coupling means for coupling said test path into said transmission line shunting said blocking means to couple energy from said transmitter directly to said receiver, and means to measure the power output of said transmitter, said calibrated adjustable attenuator serving to indicate the ratio of power input to power output of said attenuator.

References Cited in the file of this patent
UNITED STATES PATENTS

| | | |
|---|---|---|
| 2,253,589 | Southworth | Aug. 26, 1941 |
| 2,345,932 | Gould | Apr. 4, 1944 |
| 2,505,525 | Clapp et al. | Apr. 25, 1950 |
| 2,532,539 | Counter et al. | Dec. 5, 1950 |